US012787930B2

(12) United States Patent
Broschart et al.

(10) Patent No.: US 12,787,930 B2
(45) Date of Patent: Nov. 10, 2026

(54) SENSOR ARRANGEMENT FOR A COMBINE HARVESTER

(71) Applicant: Deere & Company, Moline, IL (US)

(72) Inventors: Marco Broschart, Mannheim (DE); Sydney Trausch, Mannheim (DE)

(73) Assignee: Deere & Company, Moline, IL (US)

( * ) Notice: Subject to any disclaimer, the term of this patent is extended or adjusted under 35 U.S.C. 154(b) by 339 days.

(21) Appl. No.: 18/587,069

(22) Filed: Feb. 26, 2024

(65) Prior Publication Data

US 2024/0361225 A1 Oct. 31, 2024

(30) Foreign Application Priority Data

Apr. 25, 2023 (DE) ......................... 102023110536.1

(51) Int. Cl.
*A01D 41/127* (2006.01)
*G01N 15/10* (2006.01)

(52) U.S. Cl.
CPC ..... *A01D 41/1272* (2013.01); *A01D 41/1273* (2013.01); *G01N 2015/1024* (2024.01)

(58) Field of Classification Search
CPC .................................................. A01D 41/1272
See application file for complete search history.

(56) References Cited

U.S. PATENT DOCUMENTS 7,362,233 B2 4/2008 Behnke et al.
10,058,029 B2 8/2018 Bischoff
11,083,137 B2 8/2021 Vandike et al.
2005/0282601 A1* 12/2005 Duquesne ............. A01F 12/448 460/101
2013/0109450 A1 5/2013 Puvak et al.
2015/0080069 A1* 3/2015 Fuchs ................ A01D 41/1272 460/1

FOREIGN PATENT DOCUMENTS

DE 373180 A1 4/1923
DE 4133976 A1 4/1993
(Continued)

OTHER PUBLICATIONS

Extended European Search Report and Written Opinion issued in European Patent Application No. 24166352.5 dated Sep. 16, 2024, in 14 pages.

(Continued)

*Primary Examiner* — Cathleen R Hutchins
(74) *Attorney, Agent, or Firm* — Taft Stettinius & Hollister LLP; Stephen F. Rost

(57) ABSTRACT

A sensor arrangement for a combine harvester that includes a conveyor for grain-containing crops. The conveyor can be set in a periodic movement by a drive. The sensor arrangement includes a baffle plate sensor associated with the conveyor and configured to emit an electrical signal in response to an impact of a grain. The sensor arrangement includes an evaluation circuit which is connected to the baffle plate sensor for signal transmission. The evaluation circuit is configured to process the signal generated by the baffle plate sensor and, taking into account the respective position of the conveyor along movement of the conveyor, to recognize a signal generated by a grain and to emit a corresponding output signal.

20 Claims, 2 Drawing Sheets

(56) References Cited

FOREIGN PATENT DOCUMENTS

| | | | |
|---|---|---|---|
| EP | 1516522 | A2 | 3/2005 |
| EP | 1839478 | A1 | 10/2007 |
| EP | 2742791 | A2 | 6/2014 |
| EP | 2550852 | B1 | 7/2014 |
| EP | 2761984 | A1 | 8/2014 |
| EP | 2850938 | A1 | 3/2015 |
| EP | 2977735 | A2 | 1/2016 |
| EP | 3072378 | A1 | 9/2016 |
| EP | 3141102 | A1 | 3/2017 |
| EP | 3222133 | A1 | 9/2017 |
| EP | 3563660 | A1 | 11/2019 |
| EP | 3639645 | A1 | 4/2020 |
| WO | 2016058890 | A1 | 4/2016 |

OTHER PUBLICATIONS

Liang et al., Sensor for monitoring rice grain sieve losses in combine harvesters, Biosystems Engineering 147 (2016), pp. 51-66.

* cited by examiner

SENSOR ARRANGEMENT FOR A COMBINE HARVESTER

RELATED APPLICATION

This application claims priority to application DE 10 2023 110 536.1, filed Apr. 25, 2023, which is hereby incorporated by reference herein in its entirety.

FIELD OF THE DISCLOSURE

The present disclosure relates generally to a combine harvester and more particularly to a sensor arrangement for a combine harvester.

BACKGROUND

Combine harvesters serve to harvest grain. The above-ground parts or fruits of plants, such as soy, wheat or oats, are cut off or collected or stripped, or the fruit stalks of the plants, such as maize or sunflowers, are separated and fed to a threshing and separating device to separate the grains (collectively referred to as "the grain") from the other components of the crop. After the threshing and separating operation, there are still contaminants in the grain, such as particles of straw and chaff. The mixture of grain and impurities obtained during threshing and separation is therefore fed to a cleaning system, which usually comprises a top screen and a bottom screen and optionally a pre-screen and/or a conveyor floor.

The screens and, if applicable, conveyor floor are usually suspended from front and rear hangers and are moved by means of an eccentric drive, as shown, for example, in US 2013/0109450 A1, EP 3 563 660 A1, EP 2 850 938 A1. In this way, the screens and conveyor floor are set in a periodic, oscillating back-and-forth movement, in which they move forwards and backwards and upwards and downwards on paths of which the shape is described by a circular arc or part of an ellipse. In addition, the screens are subjected to an air flow from below. This ensures that the mixture is periodically thrown upwards on the screen (at the rear, upper reversal point of the path) and lands on the screen again after covering a throwing parabola. By means of the air flow and the impact on the screen after the throwing, heavier grain is separated from the lighter contaminants. The procedure is similar for straw walkers, which are attached to a crankshaft. Conveyors or conveyor floors are also driven in the same way.

Accordingly, if the speed of the eccentric drive is constant over time, the vertical position Y of the screen or conveyor floor changes at least approximately sinusoidally as a function of time t, as shown in FIG. 2. The main part of the crop is thrown upward and backward shortly before the upper reversal point at the ejection point A and then covers the throwing parabola P. Lastly, it lands on the screen again at point L. Point N corresponds to the zero crossing of the screen, i.e., the middle position. However, it is not the case that the entire crop is ejected at ejection point A and lands again at point L, but that ejection and landing processes also take place before and after points A and L in terms of time and space.

In many cases, baffle plate sensors are assigned to the screens and/or conveyor floors and detect impacting grains. These baffle plate sensors can be arranged at any point along the screen or conveyor floor in order to detect the grain throughput at the point in question (cf. for example EP 3 563 660 A1), or they are positioned at the delivery end to detect the grains delivered onto the field or into a return conveyor (DE 41 33 976 A1 with an baffle plate sensor at the delivery end of a straw walker) or they do not move with the screen or conveyor floor, but are supported on the frame of the combine harvester and arranged in the flow of the crop delivered from a screen (EP 1 516 522 A2, WO 2016/058890 A1). In addition to the surface against which the grains impact, the baffle plate sensors comprise a signal transducer for converting the mechanical vibrations generated on impact into electrical signals, which are evaluated by an evaluation circuit. The signal transducers can be designed as piezo crystals (DE 37 31 80 A1), pressure-sensitive layers (EP 2 977 735 A2, EP 3 639 645 A1) or MEMS elements (micro-electro-mechanical system, see EP 2 761 984 A1).

The baffle plate sensors therefore detect individual grains based on the vibrations that occur when a grain impacts against the baffle plate. The difficulty lies in distinguishing the signals generated by the grains from interference and background noise, especially since the impacting grains produce different signals depending on the respective ambient conditions and mechanical properties of the grains (mass, moisture, impact speed, possibly damping materials in the material flow, etc.). It has therefore been proposed to take certain ambient conditions into account when evaluating the signals of the baffle plate sensors by means of a signal evaluation that takes these conditions into account (EP 3 141 102 A1, EP 2 742 791 A2, EP 3 222 133 A1), namely physical crop properties or the crop type, lateral inclination and fan speed.

Another parameter not taken into account in the evaluation of the signals is the impact angle of the grains on the baffle plate sensor, which also has a certain influence on the signal (Liang, Zhenwei et al, Sensor for monitoring rice grain screen losses in combine harvesters, Biosystems Engineering 147 (2016), pages 51-66).

Looking at the graph in FIG. 2, assuming that a baffle plate sensor is attached to the screen at point L and that the ejection and landing processes of the grains take place before and after points A and L in terms of time and space (i.e., instead of the throwing parabola P, there is a series of parabolas that lie before and after the curve P shown), it is evident that the different ejection and landing times lead to different impact angles of the grains on the baffle plate sensor, since the screen and thus also the baffle plate moves at a time-varying speed. If a first grain is therefore ejected at a time t1 and a second grain at a later time t2, the baffle plate also has a different speed and a different position at the landing time t3 of the first grain than at the landing time t4 of the second grain. Please refer, in this regard, to FIG. 3. It is noted that the screen continues to move between the different times t1 to t4. However, since the impact angle of the grains on the baffle plate sensor influences the signal emitted, different signals are generated by the baffle plate sensor depending on the respective ejection and landing time. Smaller signals are generally generated at flatter impact angles (t3) than at steeper impact angles (t4). This in turn means that the accuracy of the grain detection is not sufficient if—as in the prior art-static signal processing is used that is independent of the time of impact and therefore the angle of impact. This problem also occurs, albeit to a lesser extent, if the baffle plate sensor does not move with the screen, as there are also different impact angles of the grains depending on the delivery point and time of the grain on the screen. As already mentioned, said baffle plate sensors can interact not only with screens, but also with conveyor floors or straw walkers.

SUMMARY

As described herein, a sensor arrangement is provided for a combine harvester with a conveyor for grain-containing crops, wherein the conveyor is set in a periodic movement by a drive; a baffle plate sensor associated with the conveyor, wherein the baffle plate sensor is configured to emit an electrical signal in response to an impact of a grain; and an evaluation circuit connected to the baffle plate sensor for signal transmission, wherein the evaluation circuit is configured to process the signal generated by the baffle plate sensor, and wherein the evaluation circuit, in response to a respective position of the conveyor that is configured to move, is configured to recognize a signal generated by the grain and to emit a corresponding output signal.

In some implementations, the baffle plate sensor is configured to move with the conveyor.

In some implementations, the baffle plate sensor is stationary.

In some implementations, the conveyor is suspended from a chassis by one or more hangers, and wherein the conveyor is set in an oscillating motion by the drive.

In some implementations, the conveyor is attached to a crankshaft coupled to the drive, and wherein the conveyor is set in an oscillating motion by the drive.

In some implementations, the conveyor includes a screen.

In some implementations, the conveyor includes a conveyor floor.

In some implementations, the conveyor includes a straw walker.

In some implementations, the evaluation circuit, in response to a respective position of the conveyor that is configured to move, is configured to account for an impact angle of the grain on the baffle plate sensor that is dependent on the respective position of the conveyor, in order to compensate for the sensitivity of the baffle plate sensor that is dependent on the impact angle of the grain.

In some implementations, the evaluation circuit is configured to apply an amplification factor dependent on the respective position of the conveyor.

In some implementations, the evaluation circuit is configured to apply an amplification factor dependent on a threshold value dependent on a respective position of the conveyor.

In some implementations, the evaluation circuit is configured to ignore signals from the baffle plate sensor at certain positions of the conveyor.

In another implementation a combine harvester includes a conveyor for grain-containing crops, wherein the conveyor is set in a periodic movement by a drive; a baffle plate sensor associated with the conveyor, wherein the baffle plate sensor is configured to emit an electrical signal in response to an impact of a grain; and an evaluation circuit connected to the baffle plate sensor for signal transmission, wherein the evaluation circuit is configured to process the signal generated by the baffle plate sensor, and wherein the evaluation circuit, in response to a respective position of the conveyor that is configured to move, is configured to recognize a signal generated by the grain and to emit a corresponding output signal.

In some implementations, the baffle plate sensor is configured to move with the conveyor.

In some implementations, the baffle plate sensor is stationary.

In some implementations, the conveyor is suspended from a chassis by a hanger, and wherein the conveyor is set in an oscillating motion by the drive.

In some implementations, the conveyor is attached to a crankshaft coupled to the drive, and wherein the conveyor is set in an oscillating motion by the drive.

In some implementations, the evaluation circuit, in response to a respective position of the conveyor that is configured to move, is configured to account for an impact angle of the grain on the baffle plate sensor that is dependent on the respective position of the conveyor, in order to compensate for the sensitivity of the baffle plate sensor that is dependent on the impact angle of the grain.

In some implementations, the evaluation circuit is configured to apply an amplification factor dependent on the respective position of the conveyor or is configured to apply an amplification factor dependent on a threshold value dependent on a respective position of the conveyor.

In some implementations, the evaluation circuit is configured to ignore signals from the baffle plate sensor at certain positions of the conveyor.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

DETAILED DESCRIPTION

Figure 1:
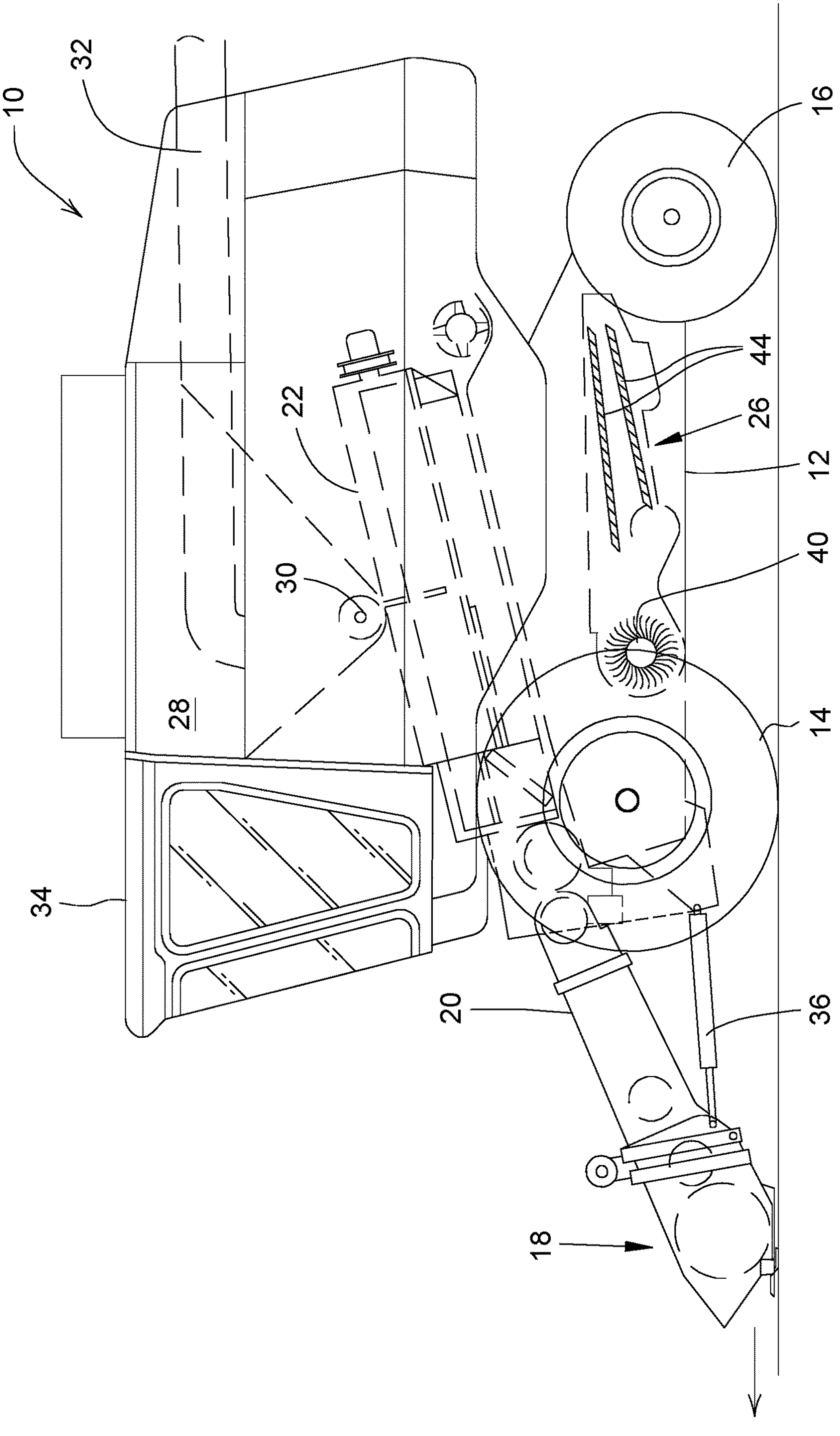
FIG. 1 shows a schematic side view of a combine harvester.

FIG. 1 shows a self-propelled harvesting machine in the form of a combine harvester 10, having a chassis 12 which is supported on the ground via driven front wheels 14 and steerable rear wheels 16 and which is moved by said wheels. The wheels 14, 16 are set in rotation by drive means (not shown) in order to move the combine harvester 10, for example, over a field that is to be harvested. In the following text, direction indications, such as front and rear, relate to the direction of travel V, running to the left in FIG. 1, of the combine harvester 10 in harvesting operation.

A harvesting header 18 in the form of a cutting unit is removably connected to the front end region of the combine harvester 10 in order to harvest crops in the form of cereal or other threshable stalk crops from the field during harvesting operation and feed them upward and rearward through an inclined conveyor assembly 20 to an axial threshing unit 22. The mixture passing through threshing concaves and gratings in the axial threshing unit 22 and containing grains and contaminants passes into a cleaning device 26. Cereal cleaned by the cleaning device 26 is supplied by means of a grain screw to a grain elevator, which conveys said cereal into a grain tank 28. The cleaned cereal from the grain tank 28 can be discharged through a discharge system with a transverse screw 30 and a discharge conveyor 32. The above-mentioned systems are driven by means of a combustion engine and are monitored and controlled by an operator from a driver's cab 34.

The cleaning device 26 comprises an upper screen 44 and a lower screen 44, which are acted upon by a fan 40 with an air flow flowing rearward and upward through the screens. The size of the screen openings and the rotational speed of the fan 44 may be varied in by an automatic cleaning setting or by the operator from the driver's cab 34. The mixture delivered from the upper screen 44 at the rear end is distributed over the field by a chaff spreader or a straw chopper and the mixture delivered from the lower screen at the rear end is fed to a further threshing operation by a return conveyor, whether by a separate re-thresher or the axial threshing unit 22.

Figure 3:
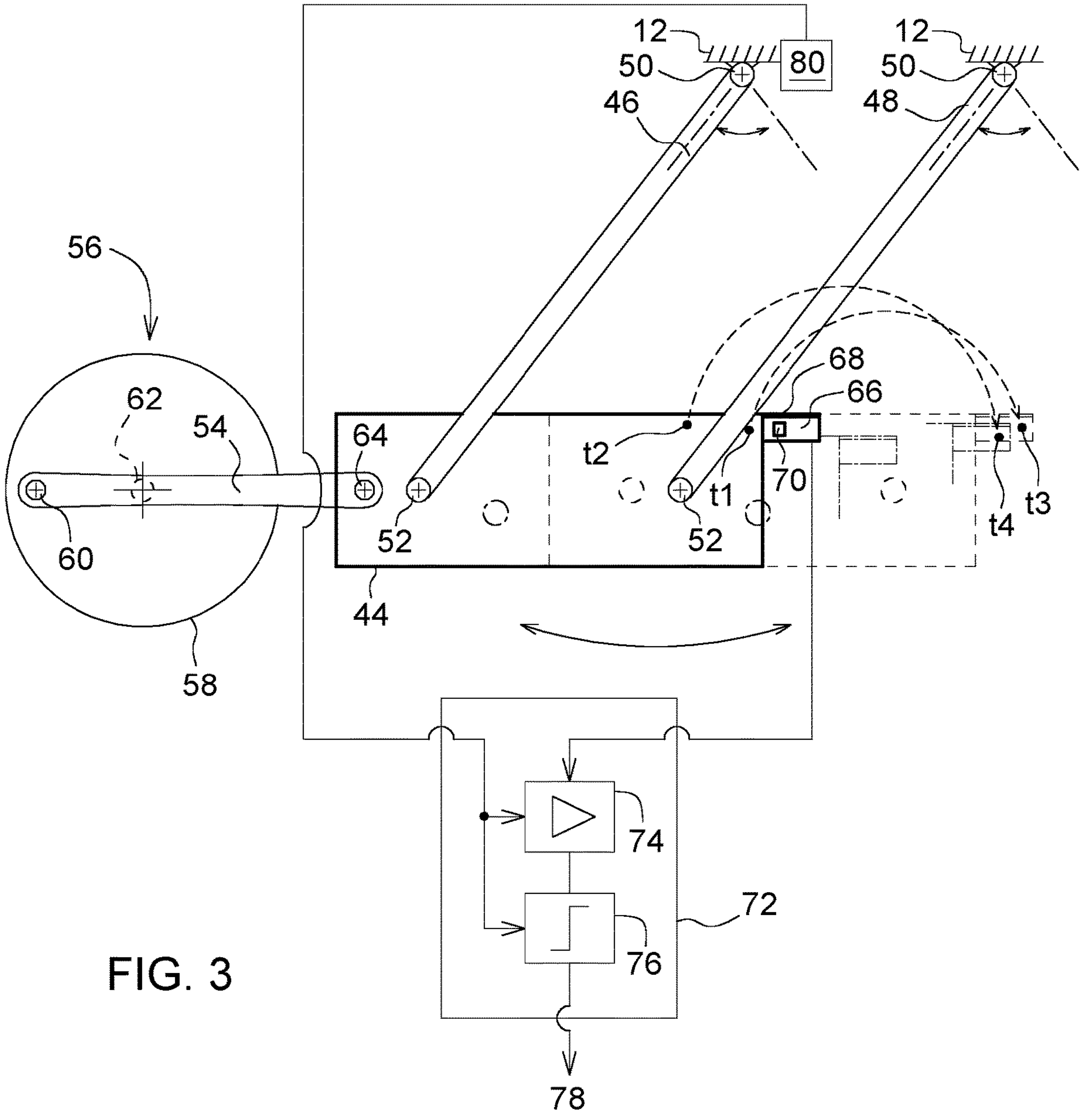
FIG. 3 shows a schematic side view of the screen in various phases of movement with an associated sensor arrangement.
Figure 2:
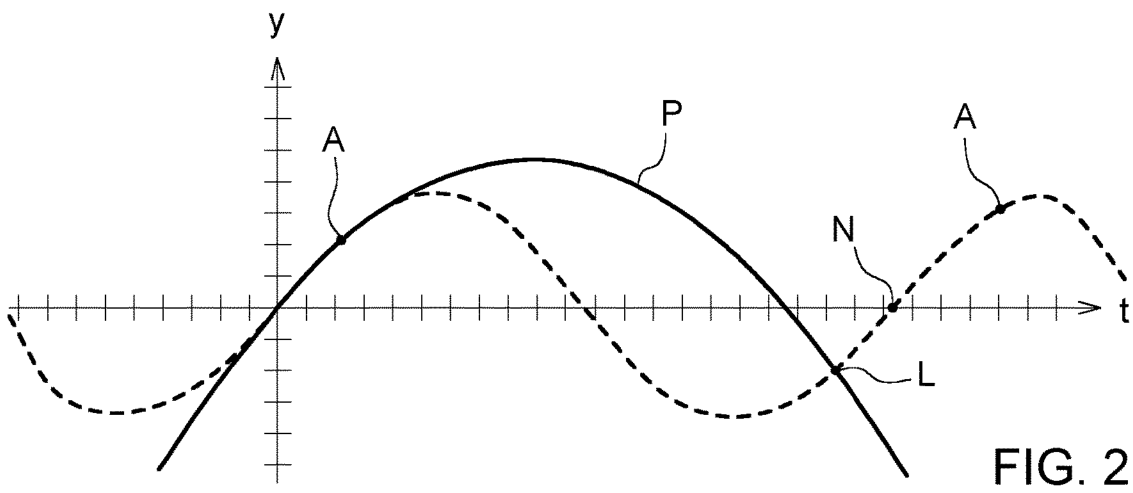
FIG. 2 shows a path-time graph of a screen for cleaning the combine harvester.

FIG. 3 shows in more detail how the screens 44 are suspended and driven. The screen 44 shown in FIG. 3 can be the upper screen 44 or the lower screen 44 from FIG. 1. It would be conceivable to equip each of the screens 44 with the drive shown, or to couple both screens 44 and provide them with a common drive. The screen 44 shown in FIG. 3 is suspended from a front hanger 46 and a rear hanger 48, the upper ends of each of which are mounted so as to be freely pivotable about horizontal axes running transversely to the forward direction of the combine harvester 10 on mountings 50 coupled to the chassis 12. In addition, the hangers 46 are mounted at their lower ends on a frame of the screen 44 so as to be freely pivotable about horizontal axes running transversely with respect to the forward direction of the combine harvester 10 by means of bearings 52. Similar hangers 46, 48 and mountings 50, 52 are also provided on the other side of the combine harvester 10, which is not shown in FIG. 3. Furthermore, the screen 44 is coupled via a crank rod 54 to an eccentric drive 56, which is composed of a drive wheel 58, which is rotatably mounted centrally about an axis 62 and can be set in rotation by a drive, with a pin 60 arranged eccentrically to the axis 62. The crank rod 54 is connected rotatably at one end to the pin 60 and is coupled at the other end to the screen 44 by a bearing 64. The axis 62 and the axes of the pin 60 and of the bearing 64 are oriented horizontally and transversely with respect to the forward direction of the combine harvester 10. The drive thus sets the screen 44, which serves as a conveyor, in a periodic back-and-forth movement, as indicated by the arrows in FIG. 3. The path-time graph of the screen 44 shown in FIG. 2 is obtained.

A baffle plate sensor 66 is mounted at the rear delivery end of the screen 44 (or two or more baffle plate sensors 66 are distributed along the width of the screen 44 at its rear end). The one or more baffle plate sensors 66 are provided with an upper plate 68 facing the crop flow, on which the crop including the grains contained therein can impact, and a signal transducer 70 mechanically coupled to the plate 68. The plate 68 and the signal transducer 70 can also be integrated in a single element, e.g., in a pressure-sensitive film (EP 2 977 735 A2, EP 3 639 645 A1), or a piezoelectric crystal or micro-mechanical-electrical system (MEMS) or any other transducer (microphone or the like) can be used as signal transducer 70.

The signal transducer 70 is connected by a wire or wirelessly (via a radio link or the like) to an evaluation circuit 72 comprising an amplifier 74 and a threshold circuit 76. An output signal 78 from the evaluation circuit 72 is fed to a control device (not shown) which can display to the operator in the cabin the number of grains detected per unit of time, thus representing the losses at the lower screen 44 or the number of grains entering the return per unit of time at the upper screen 44. This data can also be used by the control device to automatically adjust the fan speed and the screen openings.

The evaluation circuit 72 has the task of distinguishing the signals generated by grains impacting on the baffle plate sensor 66 from interfering signals which may be caused, for example, by impacting straw particles. The incoming signals from the signal transducer 70 are amplified by the amplifier 74 and the threshold circuit 76 uses certain characteristics of the amplified signal (including amplitude, but preferably also the signal shape) to recognize whether the signal obtained in each case is attributable to a grain or not. Only in the event that the threshold circuit recognizes a grain is a corresponding output signal 78 emitted. Possible embodiments and details of the evaluation circuit 72 can be found in EP 3 222 133 A1. The evaluation circuit 72 is calibrated before or during a harvesting operation, i.e., lost grains in the field are counted and compared with the number of grains measured by the baffle plate sensor 66 and the evaluation circuit 72 is adjusted accordingly. In addition, the evaluation circuit 72 can take into account certain crop and working conditions such as described in EP 3 141 102 A1, EP 2 742 791 A2 and EP 3 222 133 A1.

In FIG. 3, the screen 44 is shown in different stages of movement, namely at the front and rear (upper) reversal point and at the middle, lower reversal point. The mixture of grains and impurities (material other than grain, such as chaff or straw particles) lying on the screen 44 moves from left to right due to the vibration of the screen 44 and the air flow of the fan 40. Shortly before the rear, upper reversal point, the mixture is ejected upward and a little later lands back on the screen 44 (or on the baffle plate sensor 66).

FIG. 3 shows two examples of possible trajectories of a grain, somewhat exaggerated for illustration purposes. A first grain leaves the screen 44 at a time t1 when the screen 44 is moving rearward and upward. A second grain leaves the screen 44 somewhat later, namely at a time t2, when the screen 44 is already almost at the upper, rearward reversal point. The first grain lands on the baffle plate sensor 66 at a time t3, at which the screen 44 is at the upper, rearward reversal point, and the second grain lands on the baffle plate sensor 66 at a time t4, at which the screen 44 is already moving downward and forward again. It can be seen that the first grain lands relatively flat on the baffle plate sensor 66, while the second grain lands very steeply, almost vertically, on the baffle plate sensor 66. As the baffle plate sensor 66 is more sensitive to grains impacting vertically (these produce a larger signal from the signal transducer 70) than to grains impacting flat, the first grain will produce a smaller signal than the second grain.

In order to ensure that both grains are actually detected by the evaluation circuit 72 and produce an output signal 78, the current position of the screen 44 along its path of movement is detected by a sensor 80, which measures the angle of a hanger 46 relative to the chassis 12. The output signal of the sensor 80 is fed to the evaluation circuit 72. The evaluation circuit 72 thus receives information regarding the respective position of the screen 44 along its movement. The evaluation circuit 72 is configured to use this information to process the signals from the signal transducer 74 differently in order to compensate for the sensitivity of the baffle plate sensor 66, which depends on the impact angle at which the material impacts on the plate 68.

For this purpose, a processor of the evaluation circuit 72 has stored data in which a relationship between the output signal of the sensor 80 and the associated sensitivity of the signal transducer 74 is reflected. This relationship can be measured during tests or determined by means of calculations.

Specifically, different procedures are possible. In a first variant, the amplification of the amplifier 74 can be changed depending on the data (read from a memory based on the output signal of the sensor 80). Thus, if the output signal of the sensor 80 indicates that the grains impact relatively flat on the plate 68, the amplification of the amplifier 74 is increased and, analogously, the amplification of the amplifier 74 is reduced by contrast if the output signal of the sensor 80 indicates that the grains impact relatively steeply on the plate 68. Two or more stages can be used for the amplification.

In a second variant, the threshold value that the amplitude of a signal generated by the signal transducer 70 must exceed for an output signal 78 to be generated is changed depending on the data (read from a memory based on the output signal of the sensor 80). Thus, if the output signal of the sensor 80 indicates that the grains impact relatively flat on the plate 68, the threshold value (the amplitude of which must reach or exceed a signal generated by the signal transducer 70 in order to generate an output signal 78) of the threshold circuit 76 is selected low, and, analogously, the threshold value of the threshold circuit 76 is increased by contrast if the output signal of the sensor 80 indicates that the grains impact relatively steeply on the plate 68. Here, two or more stages can be used for the threshold value.

In a third variant, when the data read from a memory based on the output signal of the sensor 80 indicates that the grains impact the plate 68 at an angle shallower than a predetermined limit value, no output signal 78 is emitted, i.e., the signals from the signal transducer 70 are then ignored. In this variant, an output signal 78 is only emitted if the output signal of the sensor 80 indicates that the grains impact the plate 68 at an angle that is steeper than a certain limit value.

Any two or all of these variants can also be combined with each other, i.e., the threshold value and/or amplification depend on the angle and/or the signal from the signal transducer 70 is also ignored in the case of grains that impact flat. In this way, the accuracy of the detection of the grains by the baffle plate sensor 66 is improved.

It should also be noted that the baffle plate sensor 66, unlike that shown in FIG. 3, need not only be used to measure the lost grains at the upper screen 44 or the grains entering the return at the lower screen 44 (possibly also to determine the lateral distribution of the grain numbers in a variant with several baffle plate sensors 66 arranged side by side), but can be used at any other point on the combine harvester 10 at which a conveyor moves periodically and grains are detected at the end or at any other point of the conveyor by a baffle plate sensor 66. This can be a pre-screen or any conveyor floor for conveying a mixture of grain and contaminants or a straw walker. The baffle plate sensor 66 can move with the conveyor (such as the screen 44), as shown in FIG. 3, or it is supported on the chassis 12 so that the conveyor moves relative to the baffle plate sensor 66.

The sensitivity of the baffle plate sensor 66 varying depending on the impact angle of the grains and thus on the position of the conveyor is reduced or eliminated by the present disclosure. This is achieved by the unique sensor arrangement for a combine harvester 10 that includes the conveyor for grain-containing crops wherein the conveyor can be set in a periodic movement by a drive, the baffle plate sensor 66 which is associated with the conveyor and which is configured to emit an electrical signal in response to an impact of a grain, and the evaluation circuit 72 which is connected to the baffle plate sensor 66 for signal transmission and is configured to process the signal generated by the baffle plate sensor 66 and taking into account the respective position of the conveyor along its movement, to recognize a signal generated by a grain and to emit a corresponding output signal. In this way, it is possible to compensate for the sensitivity of the baffle plate sensor 66, which depends on the position of the conveyor and therefore on the angle of impact of the grain on the baffle plate sensor 66.

The baffle plate sensor 66 can move with the conveyor or can be stationary. The conveyor can be suspended from the chassis 12 by hangers 46, 48 and set in an oscillating motion by the drive, or it can be attached to a crankshaft coupled to the drive. The conveyor can therefore be a screen 44 or a conveyor floor or a straw walker.

As already described, the evaluation circuit 72 can be configured to take into account an impact angle of the grain on the baffle plate sensor 66 that is dependent on the respective position of the conveyor, in order to compensate for the sensitivity of the baffle plate sensor 66 that is dependent on the impact angle of the grain. Specifically, the evaluation circuit 72 may be configured to apply an amplification factor dependent on the respective position of the conveyor and/or a threshold value dependent thereon and/or to ignore signals from the baffle plate sensor 66 at certain positions of the conveyor.

While the above describes example implementations of the present disclosure, these descriptions should not be viewed in a limiting sense. Rather, other variations and modifications may be made without departing from the scope and spirit of the present disclosure as defined in the appended claims.

The invention claimed is:

1. A sensor arrangement for a combine harvester, comprising:

a conveyor for grain-containing crops, wherein the conveyor is set in a periodic movement by a drive;

a baffle plate sensor associated with the conveyor, wherein the baffle plate sensor is configured to emit an electrical signal in response to an impact of a grain; and an evaluation circuit connected to the baffle plate sensor for signal transmission, wherein the evaluation circuit is configured to process the electrical signal generated by the baffle plate sensor, and wherein the evaluation circuit, in response to a respective position of the conveyor along the periodic movement of the conveyor, varies signal processing of the electrical signal from the baffle plate sensor based on the respective position of the conveyor along the periodic movement so as to recognize the electrical signal generated by the impact of the grain and to emit a corresponding output signal.

2. The sensor arrangement of claim 1, wherein the baffle plate moves with the conveyor distinct from movement of the combine harvester.

3. The sensor arrangement of claim 1, wherein the baffle plate sensor is stationary.

4. The sensor arrangement of claim 1, wherein the conveyor is suspended from a chassis by one or more hangers, and wherein the conveyor is set in an oscillating motion by the drive.

5. The sensor arrangement of claim 1, wherein the conveyor is attached to a crankshaft coupled to the drive, and wherein the conveyor is set in an oscillating motion by the drive.

6. The sensor arrangement of claim 4, wherein the conveyor includes a screen.

7. The sensor arrangement of claim 4, wherein the conveyor includes a conveyor floor.

8. The sensor arrangement of claim 4, wherein the conveyor includes a straw walker.

9. The sensor arrangement of claim 1, wherein the evaluation circuit, in response to a respective position of the conveyor that is configured to move, is configured to account for an impact angle of the grain on the baffle plate sensor that is dependent on the respective position of the conveyor, in order to compensate for the sensitivity of the baffle plate sensor that is dependent on the impact angle of the grain.

10. The sensor arrangement of claim 9, wherein the evaluation circuit is configured to apply an amplification factor dependent on the respective position of the conveyor.

11. The sensor arrangement of claim 9, wherein the evaluation circuit is configured to apply an amplification factor dependent on a threshold value dependent on a respective position of the conveyor.

12. The sensor arrangement of claim 9, wherein the evaluation circuit is configured to ignore the electrical signals from the baffle plate sensor at certain positions of the conveyor.

13. A combine harvester comprising:

a conveyor for grain-containing crops, wherein the conveyor is set in a periodic movement by a drive;

a baffle plate sensor associated with the conveyor, wherein the baffle plate sensor is configured to emit an electrical signal in response to an impact of a grain; and an evaluation circuit connected to the baffle plate sensor for signal transmission, wherein the evaluation circuit is configured to process the electrical signal generated by the baffle plate sensor, and wherein the evaluation circuit, in response to a respective position of the conveyor along the periodic movement of the conveyor, varies signal processing of the electrical signal from the baffle plate sensor based on the respective position of the conveyor along the periodic movement so as to recognize the electrical signal generated by the impact of the grain and to emit a corresponding output signal.

14. The combine harvester of claim 13, wherein the baffle plate moves with the conveyor distinct from movement of the combine harvester.

15. The combine harvester of claim 13, wherein the baffle plate sensor is stationary.

16. The combine harvester of claim 13, wherein the conveyor is suspended from a chassis by a hanger, and wherein the conveyor is set in an oscillating motion by the drive.

17. The combine harvester of claim 13, wherein the conveyor is attached to a crankshaft coupled to the drive, and wherein the conveyor is set in an oscillating motion by the drive.

18. The combine harvester of claim 13, wherein the evaluation circuit, in response to a respective position of the conveyor that is configured to move, is configured to account for an impact angle of the grain on the baffle plate sensor that is dependent on the respective position of the conveyor, in order to compensate for the sensitivity of the baffle plate sensor that is dependent on the impact angle of the grain.

19. The combine harvester of claim 13, wherein the evaluation circuit is configured to apply an amplification factor dependent on the respective position of the conveyor or is configured to apply an amplification factor dependent on a threshold value dependent on a respective position of the conveyor.

20. The combine harvester of claim 13, wherein the evaluation circuit is configured to ignore the electrical signals from the baffle plate sensor at certain positions of the conveyor.

* * * * *